United States Patent
Mizumoto et al.

(10) Patent No.: US 10,063,966 B2
(45) Date of Patent: Aug. 28, 2018

(54) SPEECH-PROCESSING APPARATUS AND SPEECH-PROCESSING METHOD

(71) Applicant: HONDA MOTOR CO., LTD., Tokyo (JP)

(72) Inventors: Takeshi Mizumoto, Wako (JP); Keisuke Nakamura, Wako (JP); Kazuhiro Nakadai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 15/247,467

(22) Filed: Aug. 25, 2016

(65) Prior Publication Data
US 2017/0092287 A1    Mar. 30, 2017

(30) Foreign Application Priority Data
Sep. 29, 2015  (JP) .................. 2015-191879

(51) Int. Cl.
| | |
|---|---|
| *G10L 15/20* | (2006.01) |
| *G10L 15/26* | (2006.01) |
| *G10L 21/00* | (2013.01) |
| *H04R 3/00* | (2006.01) |
| *G10L 25/51* | (2013.01) |
| *G01S 3/80* | (2006.01) |
| *G10L 21/028* | (2013.01) |
| *G10L 21/0216* | (2013.01) |

(52) U.S. Cl.
CPC ............... *H04R 3/005* (2013.01); *G01S 3/80* (2013.01); *G10L 21/028* (2013.01); *G10L 25/51* (2013.01); *G10L 2021/02166* (2013.01)

(58) Field of Classification Search
None
See application file for complete search history.

(56) References Cited

U.S. PATENT DOCUMENTS

| | | | |
|---|---|---|---|
| 8,160,270 B2 * | 4/2012 | Oh ........................ | H04R 1/406 381/92 |
| 8,526,633 B2 * | 9/2013 | Ukai ..................... | H04R 1/406 381/122 |
| 9,305,566 B2 * | 4/2016 | Wakabayashi ...... | G10L 21/0208 |
| 9,420,372 B2 * | 8/2016 | Kordon ................ | H04R 3/005 |
| 9,549,274 B2 * | 1/2017 | Nakamura ........... | H04R 29/004 |
| 9,560,440 B2 * | 1/2017 | Wang .................... | G01S 15/42 |
| 9,622,003 B2 * | 4/2017 | Schmidt ............... | H04R 29/00 |
| 2009/0086998 A1 * | 4/2009 | Jeong .................... | H04R 3/005 381/119 |
| 2009/0116655 A1 * | 5/2009 | Tanaka ............... | H03H 21/0014 381/58 |
| 2009/0129609 A1 * | 5/2009 | Oh ........................ | H04R 1/406 381/92 |
| 2017/0353789 A1 * | 12/2017 | Kim ...................... | H04R 3/005 |
| 2017/0353790 A1 * | 12/2017 | Kim ...................... | H04R 3/005 |

FOREIGN PATENT DOCUMENTS

JP   2010-181448   8/2010

* cited by examiner

*Primary Examiner* — Satwant Singh
(74) *Attorney, Agent, or Firm* — Rankin, Hill & Clark LLP (57) ABSTRACT

A speech-processing apparatus includes: a representative transfer function estimation unit that uses a sound signal which is collected by using a microphone array of which the arrangement is unknown, which has a plurality of channels, and of which the number of sound sources is unknown and that estimates a transfer function with respect to a sound source.

13 Claims, 6 Drawing Sheets

SIGNAL OF n-th SPEECH AND m-th CHANNEL AFTER SHORT-TIME FOURIER TRANSFORM $X_{[n]m}(\omega, f)$ $$X_{[n]}(\omega, f) = [X_{[n]1}(\omega, f), \ldots, X_{[n]M}(\omega, f)]^T \quad (1 \leq f \leq Fn)$$

SPEECH-PROCESSING APPARATUS AND SPEECH-PROCESSING METHOD

CROSS-REFERENCE TO RELATED APPLICATION

Priority is claimed on Japanese Patent Application No. 2015-191879, filed on Sep. 29, 2015, the contents of which are incorporated herein by reference.

BACKGROUND

Field of the Invention

The present invention relates to a speech-processing apparatus and a speech-processing method.

Background

Recently, technologies on sound source separation in which speeches of a plurality of speakers are separated into speech for each one of the plurality of speakers or on sound source localization in which a location of a speaker is localized have been proposed in fields such as a vehicle, a robot, and a meeting record generation apparatus. When a microphone array is used to perform sound source localization or sound source separation, it is necessary to obtain a transfer function between the microphone array and a sound source to be observed as prior information by geometric calculation or measurement of a specific signal. There may be a case in which it is difficult to obtain transfer function information that should be obtained in advance, for example, when a user fabricates a microphone array by oneself depending on the purpose. Therefore, improvements are desired in use of apparatuses that perform sound source localization and sound source separation.

As a technique in which a transfer function is estimated, for example, Japanese Unexamined Patent Application, First Publication No. 2010-181448 discloses that a predetermined signal is output from a microphone in an online state, and the output signal is received by a microphone to dynamically estimate a transfer function.

SUMMARY

However, according to the technique disclosed in Japanese Unexamined Patent Application, First Publication No. 2010-181448, when a transfer function is estimated, it is necessary to output a known speech signal from a loudspeaker or the like, and a transfer function cannot be obtained from only an actual speech signal output from a speaker. That is, according to the technique disclosed in Japanese Unexamined Patent Application, First Publication No. 2010-181448, a transfer function cannot be obtained from a sound signal of which the positions of sound sources, the number of sound sources, the positions of microphones, and the position relationship between each microphone and the sound sources are unknown.

An object of an aspect of the present invention is to provide a speech-processing apparatus and a speech-processing method capable of obtaining a transfer function from only a speech signal and performing a process on the speech signal.

(1) A speech-processing apparatus according to an aspect of the present invention includes: a representative transfer function estimation unit that uses a sound signal which is collected by using a microphone array of which the arrangement is unknown, which has a plurality of channels, and of which the number of sound sources is unknown and that estimates a transfer function with respect to a sound source.

(2) In the aspect of the above (1), the speech-processing apparatus may further include: a speech zone detection unit that detects a plurality of speech zones from the sound signal that has the plurality of channels; a transfer function estimation unit that estimates a transfer function by using a speech signal of a speech zone detected by the speech zone detection unit; a feature quantity calculation unit that calculates a feature quantity by using the speech signal; and a clustering unit that estimates the number of sound sources by classifying the feature quantity calculated by the feature quantity calculation unit into clusters, wherein the representative transfer function estimation unit may estimate each transfer function to each one of the clusters as each transfer function with respect to a sound source based on the transfer function estimated by the transfer function estimation unit and the number of sound sources estimated by the clustering unit.

(3) In the aspect of the above (2), the transfer function estimation unit may select one from the plurality of channels included in the speech signal as a representative channel and may estimate the transfer function by using the speech signal of the selected representative channel and the speech signal of the rest of the plurality of channels.

(4) In the aspect of the above (2) or (3), the feature quantity calculation unit may select one from the plurality of channels included in the speech signal as a representative channel and may calculate the feature quantity by using the speech signal of the selected representative channel and the speech signal of the rest of the plurality of channels.

(5) In the aspect of the above (4), the feature quantity may be a value based on a phase difference between the speech signal of the representative channel and the speech signal of the rest of the plurality of channels.

(6) In the aspect of any one of the above (2) to (5), the clustering unit may determine, based on a distance between the clusters to which the number of integrated clusters converges, the number of the clusters.

(7) In the aspect of any one of the above (2) to (6), the representative transfer function estimation unit may calculate a center of each one of the clusters obtained by the clustering unit, may calculate, with respect to the feature quantity included in each cluster, a distance between the feature quantity and the calculated center of each one of the clusters, may calculate a weighted value by using a sum of the calculated distances and each one of the calculated distances, and may estimate, by using a transfer function corresponding to the feature quantity included in the cluster and the calculated weighted value, a transfer function in the center of the cluster as a transfer function to a sound source.

(8) A speech-processing method according to another aspect of the present invention includes: (a) causing a sound signal acquisition unit to acquire a sound signal which is collected by using a microphone array of which the arrangement is unknown, which has a plurality of channels, and of which the number of sound sources is unknown; (b) causing a speech zone detection unit to detect a plurality of speech zones from the sound signal that has the plurality of channels; (c) causing a transfer function estimation unit to estimate a transfer function by using a speech signal of a speech zone detected in (b); (d) causing a feature quantity calculation unit to calculate a feature quantity by using the speech signal; (e) causing a clustering unit to estimate the number of sound sources by classifying the feature quantity calculated in (d) into clusters; and (f) causing a representative transfer function estimation unit to estimate each transfer function to each one of the clusters as each transfer function with respect to a sound source based on the transfer function estimated in (c) and the number of sound sources estimated in (e).

According to the configuration of (1), (2), or (8) described above, it is possible to estimate a transfer function with respect to a sound source based on a sound signal, which is collected by using a microphone array of which the arrangement is unknown, and of which the number of sound sources is also unknown. It is possible to use the transfer function estimated in this way for sound source separation and sound source localization. As a result, according to the configuration of (1), (2), or (8), since it is unnecessary to emit a sound signal in advance to estimate the transfer function, it is possible to omit preparation prior to driving the apparatus.

According to the configuration of (3) described above, by using a sound signal of the representative channel, it is possible to estimate a transfer function for each speech zone, and it is possible to use the estimated transfer function to estimate a transfer function with respect to a sound source.

According to the configuration of (4) or (5) described above, by using a sound signal of a representative channel, it is possible to calculate a feature quantity for each speech zone, and it is possible to use the calculated feature quantity to estimate a transfer function with respect to a sound source. Further, according to the configuration of (5), it is possible to estimate a transfer function by using a phase difference between microphones even in a state where a transfer function is not completely obtained in advance.

According to the configuration of (6) described above, it is possible to estimate the number of clusters, that is, the number of sound sources with good accuracy.

According to the configuration of (7) described above, by performing spatial clustering, it is possible to estimate a transfer function in which an assumed position of a speaker can be in a certain range.

DESCRIPTION OF THE EMBODIMENTS

First, an outline of an embodiment of the present invention will be described.

Figure 1:
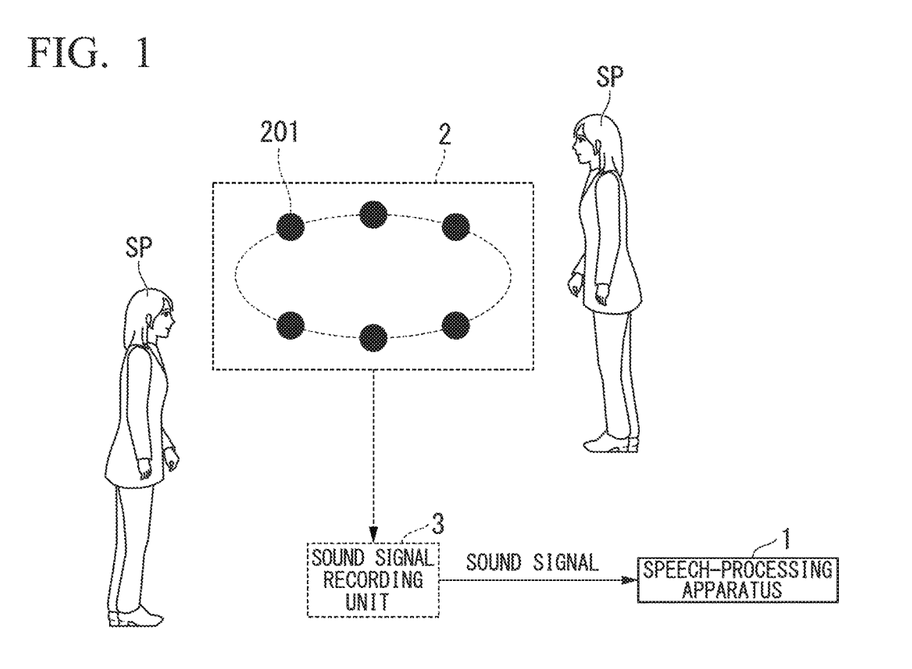
FIG. 1 is a schematic view showing an embodiment of the present invention.

FIG. 1 is a schematic view showing an embodiment of the present invention. As shown in FIG. 1, according to the embodiment of the present invention, a microphone array 2 configured by at least two or more microphones 201 is used, and a sound signal recording unit 3 of M channels (M is an integer equal to or more than two, M is consistent with the number of the microphones 201) records a sound signal. At the time of recording, the position relationship of the microphones 201 is unknown, the positions of speakers SP are also unknown, the number of speakers is also unknown, and the position relationship between each microphone 201 and the speakers SP is also unknown. A speech-processing apparatus 1 acquires sound signals of M channels recorded in such a condition. The speech-processing apparatus 1 detects a speech zone from the acquired sound signals of M channels. Then, the speech-processing apparatus 1 classifies the acquired sound signals of M channels into a sound signal estimated to come from the same direction based on a feature quantity of a sound signal included in the speech zone. The speech-processing apparatus 1 estimates a transfer function for each sound signal in the classified direction, and uses the estimated transfer function to perform a sound source separation process and a sound source localization process. The speech-processing apparatus 1 repeats estimation of a transfer function by using a signal of a localized sound source until the transfer function converges. According to the embodiment of the present invention, by this process, it is possible to extract a speech signal for each direction from a sound signal of which the positions of sound sources, the number of sound sources, the positions of the microphones 201, and the position relationship between each microphone 201 and the sound sources (speakers SP) are unknown. Further, it is assumed that the position of the microphone array 2 and the position of the microphones 201 are fixed, for example, during one session in a meeting. Note that, one session is, for example, a conversation included in one entire meeting. Further, in the embodiment of the present invention, sound signals of a plurality of channels may be obtained, and therefore, the number of the microphones 201 in the microphone array 2 may be two or more.

Hereinafter, a specific embodiment of the present invention will be described with reference to the drawings.

First, a configuration of the speech-processing apparatus 1 is described.

Figure 2:
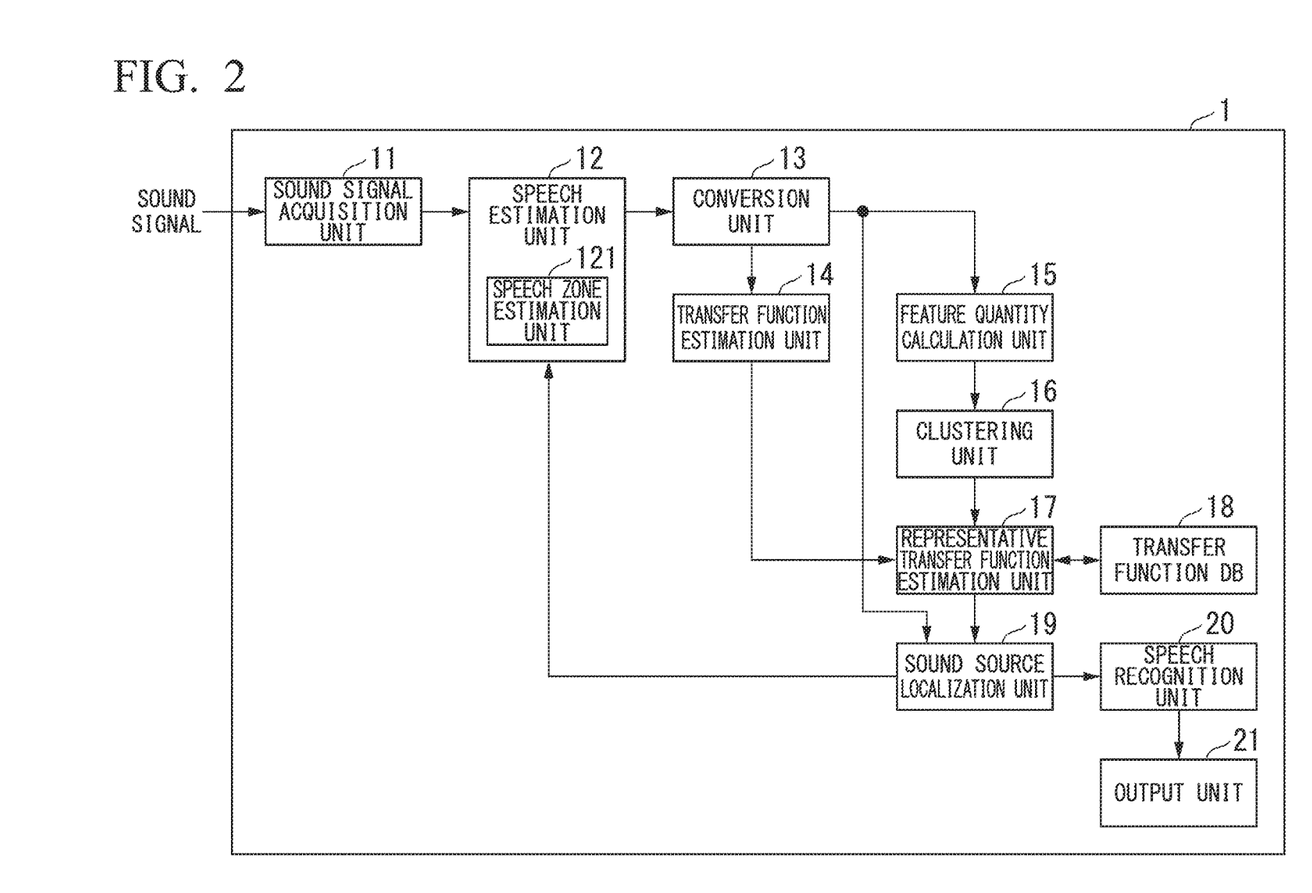
FIG. 2 is a block diagram showing a schematic configuration of a speech-processing apparatus according to an embodiment.

FIG. 2 is a block diagram showing a schematic configuration of the speech-processing apparatus 1 according to the present embodiment. As shown in FIG. 2, the speech-processing apparatus 1 includes a sound signal acquisition unit 11, a speech estimation unit 12, a conversion unit 13, a transfer function estimation unit 14, a feature quantity calculation unit 15, a clustering unit 16, a representative transfer function estimation unit 17, a transfer function DB (database) 18, a sound source localization unit 19, a speech recognition unit 20, and an output unit 21.

The sound signal acquisition unit 11 acquires sound signals of M channels and outputs the acquired sound signals of M channels to the speech estimation unit 12. Note that, in the present embodiment, the collected sound signal is, for example, obtained by recording a meeting held in a meeting room. Therefore, it is assumed that the speakers rarely move.

The speech estimation unit 12 includes a speech zone estimation unit 121.

The speech estimation unit 12 extracts, for example, a sound signal of one session from the sound signals of M channels output by the sound signal acquisition unit 11. The speech zone estimation unit 121 detects speech zones from the extracted sound signal of one session and outputs a speech signal for each detected speech zone to the conversion unit 13. Note that, one session is, for example, a conversion made at one meeting or the like. The speech zone estimation unit 121 detects, from the sound signals of M channels, for example, N zones (N is an integer equal to or more than zero) in which a signal of equal to or more than a predetermined threshold value is included as speech zones. Alternatively, the speech zone estimation unit 121 may detect a speech zone by using a zero-cross method, a GMM method, and the like. The zero-cross method is a method in which with respect to an amplitude exceeding a predetermined level, a time when a zero-cross number exceeds a predetermined number is a speech start edge, a time when a value becomes a predetermined value or less is a speech end edge, an input is delimited at the speech end edge, and a zone from the speech start edge to the speech end edge is detected as one speech. Further, the GMM (Gaussian mixture model) method is a method in which GMMs of speech and non-speech are defined, a feature quantity is calculated for each input short time frame, a likelihood calculation for each GMM is performed based on the calculated feature quantity, and a start and end of a speech zone are determined based on a likelihood ratio of the speech GMM to the non-speech GMM.

The conversion unit 13 converts the speech signal for each speech zone output by the speech estimation unit 12 by short-time Fourier transform into a signal in a frequency domain and outputs the converted speech signal for each speech zone to the transfer function estimation unit 14, the feature quantity calculation unit 15, and the sound source localization unit 19.

The transfer function estimation unit 14 selects one from speech signals for each speech zone output by the conversion unit 13 and estimates N transfer functions for each speech zone using the selected sound signal as a basis. Note that, an estimation method of a transfer function is described below. The transfer function estimation unit 14 outputs the estimated N transfer functions for each speech zone to the representative transfer function estimation unit 17.

The feature quantity calculation unit 15 selects one from the sound signals of M channels for each speech zone output by the conversion unit 13 as a representative channel. The feature quantity calculation unit 15 calculates, as a spatial feature quantity, a sample difference between the selected channel as a basis and another channel and outputs the calculated spatial sound feature quantity to the clustering unit 16. Note that, a calculation method of a spatial feature quantity is described below.

The clustering unit 16 expands the feature quantity output by the feature quantity calculation unit 15 into an (M−1)-dimensional space and classifies the feature quantity to thereby estimate the number of sound sources (the number of speakers). The clustering unit 16 outputs the classified result to the representative transfer function estimation unit 17. That is, in the present embodiment, the feature quantity calculation unit 15 and the clustering unit 16 estimate a sound source position using one channel as a basis. Note that, a clustering process is described below.

The representative transfer function estimation unit 17 obtains a center for each cluster estimated by the clustering unit 16 and calculates a distance between each feature quantity and the center for each cluster. The representative transfer function estimation unit 17 uses N transfer functions for each speech zone output by the transfer function estimation unit 14, performs weighting in consideration also of the distance from the center of the cluster, and integrates the transfer functions to determine a transfer function that represents the cluster. That is, the representative transfer function estimation unit 17 estimates a transfer function of the sound source position estimated by the feature quantity calculation unit 15 and the clustering unit 16. The representative transfer function estimation unit 17 causes the transfer function DB 18 to store the determined representative transfer function and further outputs the determined representative transfer function to the sound source localization unit 19. Note that, estimation and determination methods of the representative transfer function are described below.

The transfer function DB 18 stores a transfer function estimated for each direction.

The sound source localization unit 19 performs a sound source localization process on the sound signal of M channels output by the conversion unit 13 by using the representative transfer function output by the representative transfer function estimation unit 17. Note that, the sound source localization unit 19 calculates a spatial spectrum that indicates a power for each direction by using, for example, a multiple signal classification (MUSIC) method. The sound source localization unit 19 estimates a sound source direction for each sound source based on the calculated spatial spectrum. In the present embodiment, since the positions of the microphones 201, the arrangement of the microphones 201, and the positions of sound sources are unknown, when it is determined, for example, by a clustering process, that the number of sound sources is P (P is an integer equal to or more than zero), estimated orientations for each sound source are a first direction, a second direction, . . . , and a P-th direction. Note that, an estimation method of the sound source direction is described below. The sound source localization unit 19 outputs a localization result of sound source localization to the speech estimation unit 12 and the speech recognition unit 20.

The speech recognition unit 20 calculates a feature quantity with respect to the localization result output by the sound source localization unit 19.

The speech recognition unit 20 performs a speech recognition process by using the calculated feature quantity and a speech recognition model stored in the speech recognition unit 20. The speech recognition unit 20 determines a word having the highest likelihood calculated by using the speech recognition model as a recognition result for the calculated feature quantity. The speech recognition unit 20 outputs text data representing the recognition result as speech contents for each sound source to the output unit 21.

The output unit 21 outputs the recognition result output by the speech recognition unit 20 to an external apparatus (not shown). Note that, the output unit 21 may be, for example, an image display unit, a speaker, and the like.

<Acquired Sound Signal, Speech Zone>

Next, an acquired sound signal and a speech zone are described.

Figure 3:
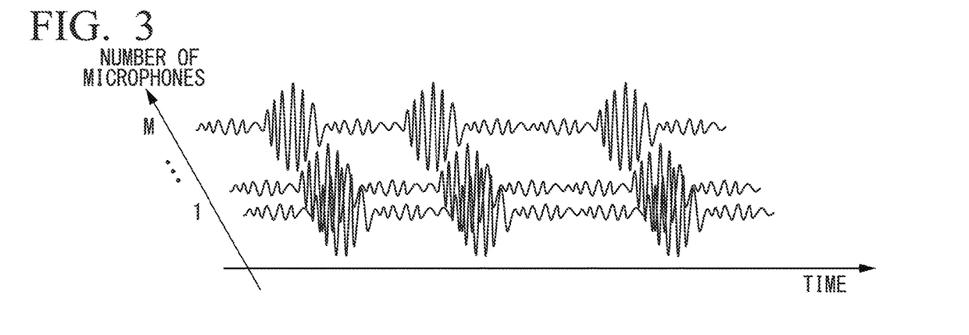
FIG. 3 is a view showing an example of an acquired sound signal according to the embodiment.
Figure 4:
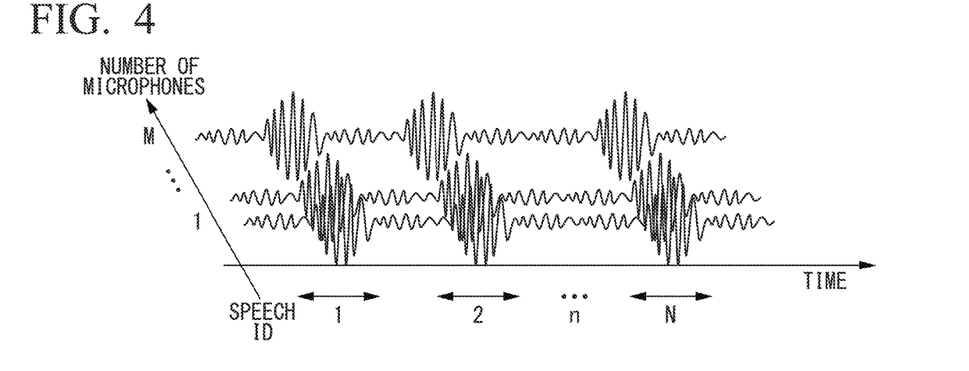
FIG. 4 is a view showing an example of a speech zone according to the embodiment.

FIG. 3 is a view showing an example of an acquired sound signal according to the present embodiment. FIG. 4 is a view showing an example of a speech zone according to the present embodiment. In FIG. 3 and FIG. 4, the horizontal axis is time, and the vertical axis is the number of microphones.

In the example shown in FIG. 3, sound signals of M channels collected by using M microphones 201 by the sound signal acquisition unit 11 are presented.

FIG. 4 shows an example in which the speech estimation unit 12 detects N speech zones (1, . . . , n, . . . , N, N is an integer equal to or more than one, n is an integer of 1 to N)

from the sound signals of M channels and imparts a speech ID (identifier) in the detected order.

<Conversion into Frequency Domain>

Next, conversion from a time domain into a frequency domain performed by the conversion unit 13 is described.

Figure 5:
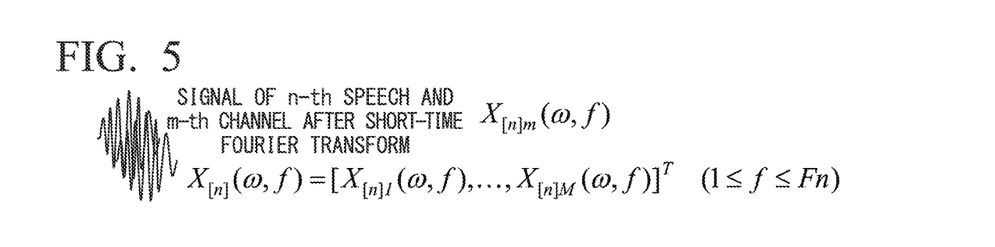
FIG. 5 is a view describing conversion from a time domain to a frequency domain according to the embodiment.

FIG. 5 is a view describing conversion from a time domain into a frequency domain according to the present embodiment.

As shown in FIG. 5, the conversion unit 13 performs conversion from a time domain into a frequency domain by performing short-time Fourier transform for each speech zone. For example, when a signal of n-th speech and an m-th channel (m is an integer of 1 to M) after short-time Fourier transform is $X_{[n]m}(\omega, f)$, an n-th signal $X_{[n]}(\omega, f)$ of 1 to M channels after short-time Fourier transform is represented as shown in Expression (1). Note that, $\omega$ represents a frequency, and f represents a frame (index).

$$X_{[n]}(\omega,f) = [X_{[n]1}(\omega,f), \ldots, X_{[n]M}(\omega,f)]^T \quad (1)$$

In Expression (1), $[\bullet]^T$ represents a transpose matrix. Further, f represents a value equal to or more than one and equal to or less than Fn.

<Estimation of Transfer Function>

Next, an estimation method of a transfer function performed by the representative transfer function estimation unit 17 is described.

When a signal in a frequency domain of the m-th microphone 201 is $X_m(\omega, f)$, a sound signal (sound source signal) in a frequency domain is $S(\omega, f)$, and a transfer function in a direction $\varphi$ is $A_m(\omega,\varphi)$, a relationship in Expression (2) is satisfied.

$$X_m(\omega,f) = A_m(\omega,\psi)S(\omega,f) \quad (2)$$

According to Expression (2), the transfer function $A_m(\omega, \varphi)$ is represented as shown in Expression (3).

$$A_m(\omega, \psi) = \frac{X_m(\omega, f)}{S(\omega, f)} \quad (3)$$

Note that, in Expressions (2) and (3), since $S(\omega)$ and the direction $\varphi$ are unknown, the transfer function cannot be calculated by using these.

Therefore, in the present embodiment, the representative transfer function estimation unit 17 sequentially selects one speech zone from the N speech zones and selects one as a representative channel from frequency-domain signals $X_m(\omega, f)$ of M channels in the selected speech zone. Hereinafter, an example is described in which the first channel is selected as the representative channel; however, the selected channel may be any one of the second to M-th channel.

Thereby, the transfer function $A_m(\omega, \varphi)$ is represented as shown in Expression (4).

$$A_m(\omega, \psi) = \frac{X_m(\omega, f)}{X_1(\omega, f)} \quad (4)$$

A time difference between the signals acquired by the microphones 201 occurs depending on the arrangement of the microphones 201 and the distance relationship to the sound sources. Thereby, when a signal of another channel is present at a time before a time when a signal of a reference channel is present, the transfer function has a peak at a negative time.

Therefore, in the present embodiment, a reference channel $X_1(\omega, f)$ is shifted by $T_0$ samples ($T_0$ is a predetermined sample number) by using $X^{\sim}_1(\omega, f)$ such that signals of all channels have a positive time with respect to the reference channel, and a signal at a time t is made $X_1[t](t+T_0)$. Note that, $X^{\sim}_1(\omega, f)$ is a value that shifts the transfer function $A_m(\omega, \varphi)$ to a positive time.

By using the $X^{\sim}_1(\omega, f)$, $X_m(\omega, f)$, and the F frame, the regression model is defined as shown in Expression (5).

$$\underbrace{\begin{bmatrix} X_1(f+1) & \ldots & X_M(f+1) \\ \vdots & \ddots & \vdots \\ X_1(f+M) & \ldots & X_M(f+M) \end{bmatrix}}_{X_{[1:F]}} = \underbrace{\begin{bmatrix} \tilde{X}_1(f+1) \\ \vdots \\ \tilde{X}_1(f+F) \end{bmatrix}}_{\Omega_{[1:F]}} \underbrace{\begin{bmatrix} A_1(\psi) \\ \vdots \\ A_M(\psi) \end{bmatrix}^T}_{A^T(\omega,\psi)} \quad (5)$$

In Expression (5), the left-hand side is expressed by $X_{[1:F]}$, the first term of the right-hand side is expressed by $\Omega_{[1:F]}$, and the second term of the right-hand side is expressed by $A^T(\omega, \varphi)$. Note that, $\Omega_{[1:F]}$ is an independent variable.

According to Expression (5), $A^T(\omega, \varphi)$ is represented as shown in Expression (6).

$$A^T(\omega,\psi) = (\Omega_{[1:F]}^T \Omega_{[1:F]})^{-1} \Omega_{[1:F]}^T X_{[1:F]} \quad (6)$$

In Expression (6), the positions of the microphones 201 are not included, but sound properties inside a room (room-acoustics) are included.

Note that, the method becomes further robust by securing a sufficient number of frames.

When the number of speech zones is N, a transfer function is estimated for each speech zone. The transfer function $A_{[n]}(\omega)$ in a speech zone n is represented as shown in Expression (7).

$$A_{[n]}(\omega) = [A_{[n]1}(\omega), \ldots, X_{[n]M}(\omega)]^T \quad (7)$$

As described above, in the present embodiment, a signal of a known sound source that is emitted from a speaker as in the related art is not used, but an acquired actual sound signal is used to estimate a transfer function.

<Calculation of Spatial Feature Quantity>

Next, a calculation method of a sound feature quantity performed by the feature quantity calculation unit 15 is described.

The feature quantity calculation unit 15 selects one channel that is the same as the channel selected by the representative transfer function estimation unit 17. The present embodiment is described using an example in which the first channel is selected.

The feature quantity calculation unit 15 calculates a sample difference $\tau$ between the selected one channel and another channel for each speech zone with respect to the frequency-domain signals output by the conversion unit 13. Here, the sample difference $\tau_{[n]}$ in the n-th speech zone is represented by an (M−1)-dimensional vector as shown in Expression (8).

$$\tau_{[n]} = [\tau_{[n]2}, \ldots, \tau_{[n]M}]^T \quad (8)$$

Further, a sample difference $\tau_{[n]m}$ of an n-th speech zone between the one channel and the m-th channel is represented as shown in Expression (9). In the present embodiment, the sample difference is referred to as a spatial feature quantity.

$$\tau_{[n]m} = \mathrm{argmax}_\tau \sum_{f=1}^{F_n} \int_{-\infty}^{\infty} \frac{X_{[n]1}(\omega,f)X_{[n]m}^*(\omega,f)}{|X_{[n]1}(\omega,f)X_{[n]m}^*(\omega,f)|} e^{j\omega\tau} d\omega \qquad (9)$$

In Expression (9), argmax represents a function that selects a value of a domain of definition such that a function value is maximized. Further, [•]* is a complex conjugate of [•]. Note that, a method in which a reference channel is provided to calculate a spatial feature quantity as described above is referred to as a multi-channel GCC-PHAT (generalized cross-correlation methods with phase transform) method in the present embodiment. Note that, the GCC-PHAT method is a method in which a mutual correlation function between two speech waveforms is obtained by a calculation in a frequency domain. The spatial feature quantity is direction information.

<Spatial Clustering>

Next, a spatial clustering method performed by the clustering unit 16 is described.

Figure 6:
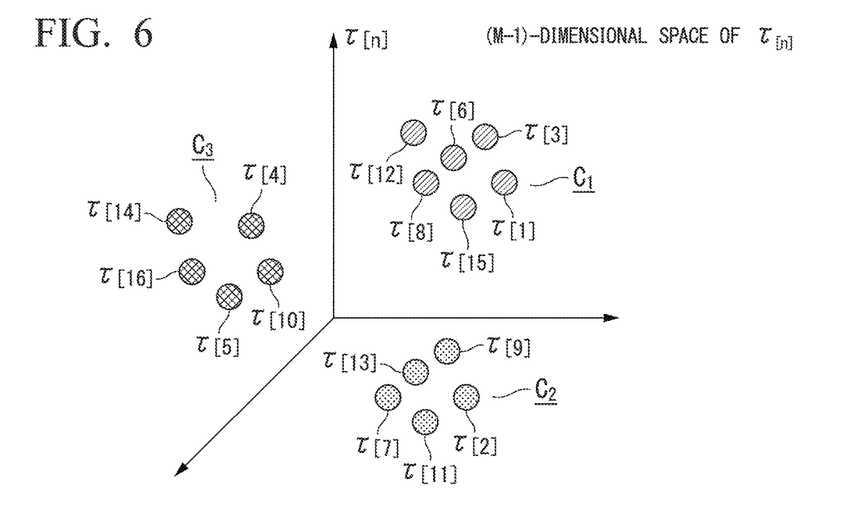
FIG. 6 is a view showing an example of a spatial feature quantity and an example of spatial clustering according to the embodiment.

FIG. 6 is a view showing an example of a spatial feature quantity and an example of spatial clustering according to the present embodiment. Further, FIG. 6 shows an (M−1)-dimensional space of a spatial feature quantity. The example shown in FIG. 6 is an example in which M is four.

Further, the example shown in FIG. 6 is a result of performing a clustering process, by using a known method, with respect to sixteen spatial feature quantities when the number of speech zones is sixteen (N=16), that is, the number of spatial feature quantities is sixteen ($\tau_{[1]}$ to $\tau_{[16]}$). Note that, the clustering unit 16 classifies spatial feature quantities into clusters, for example, by using an agglomerative clustering method. Note that, when the number of speakers is known, the clustering unit 16 may perform a clustering process, for example, by using a k-means method and the like.

In the example shown in FIG. 6, the spatial feature quantities $\tau_{[1]}$, $\tau_{[3]}$, $\tau_{[6]}$, $\tau_{[8]}$, $\tau_{[12]}$, $\tau_{[15]}$ are classified into a first cluster $C_1$, the spatial feature quantities $\tau_{[2]}$, $\tau_{[7]}$, $\tau_{[9]}$, $\tau_{[11]}$, $\tau_{[13]}$ are classified into a second cluster $C_2$, and the spatial feature quantities $\tau_{[4]}$, $\tau_{[5]}$, $\tau_{[10]}$, $\tau_{[14]}$, $\tau_{[16]}$ are classified into a third cluster $C_3$. The clustering unit 16 classifies a spatial feature quantity (sample difference) which is information representing a position, and therefore, the classified result of spatial feature quantities corresponds to a sound source position depending on the sample difference.

Next, an estimation method of the number of clusters, that is, the number of speakers performed by the clustering unit 16 is described.

The distance between clusters is defined as the distance between centers of the clusters. The distance between a cluster i and a cluster j (i and j are integers equal to or more than one that are different from each other) is represented in Expression (10).

$$\Delta_{ij} = \left\| \frac{1}{N_i} \sum_{n \in i} \tau_{[n]} - \frac{1}{N_j} \sum_{n \in j} \tau_{[n]} \right\| \qquad (10)$$

Figure 7:
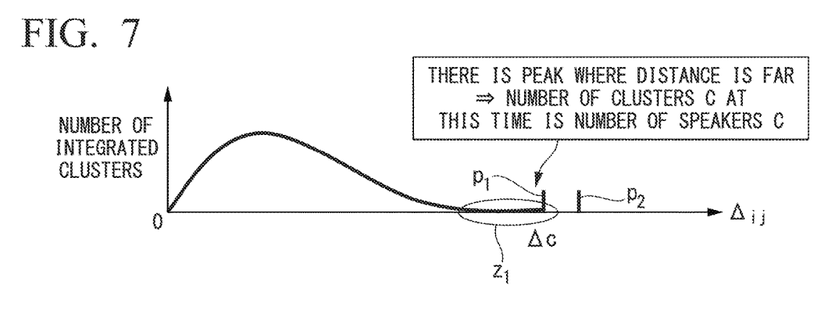
FIG. 7 is a view showing an estimation method of the number of speakers according to the embodiment.

FIG. 7 is a view showing an estimation method of the number of speakers according to the present embodiment. In FIG. 7, the vertical axis represents the number of integrated clusters, and the horizontal axis represents a distance $\Delta_{ij}$ between clusters. In the present embodiment, the number of clusters is estimated by confirming how many clusters are included in the distance $\Delta_{ij}$ between clusters when the distance $\Delta_{ij}$ which is a sample difference is increased.

In the example shown in FIG. 7, when the distance $\Delta_{ij}$ between clusters is zero, the number of clusters is also zero. When the distance $\Delta_{ij}$ between clusters is zero, in the example shown in FIG. 6, since the number of spatial feature quantities is sixteen, and there is no distance between spatial feature quantities, the number of integrated clusters is zero. Then, the number of clusters increases as the distance $\Delta_{ij}$ between clusters increases. Then, the number of clusters reaches a peak as the distance $\Delta_{ij}$ between clusters increases. Then, the number of integrated clusters decreases after the peak as the distance $\Delta_{ij}$ between clusters increases. It is known that the number of integrated clusters converges on zero, but there is a peak of the number of integrated clusters at a position away from zero in $\Delta_{ij}$. This is because signals of the same speaker have a similar sample difference and therefore tend to be integrated by performing agglomerative clustering. The peak in FIG. 7 represents a distance at which the spatial feature quantities of the speaker are agglomerated. On the other hand, since speeches of different speakers are spatially separated, a peak $p_1$ occurs when the distance is increased to a distance Δc at which the clusters of the first speaker and another speaker are integrated to each other. As the distance is further increased, for example, when the number of speakers is three, all the spatial feature quantities are integrated to one cluster, and a peak $p_2$ occurs.

In the present embodiment, the clustering unit 16 determines, as the number of speakers C, the number of clusters C in a region $z_1$ before the clusters of the first speaker and another speaker are integrated to each other, that is, before there is the peak $p_1$ in the distance Δc. The example shown in FIG. 6 is an example of C=3.

<Calculation of Representative Transfer Function>

Next, a calculation method of a representative transfer function performed by the representative transfer function estimation unit 17 is described.

Figure 8:
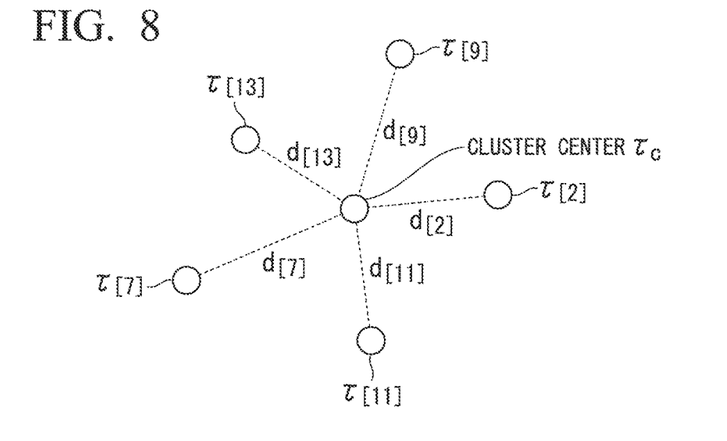
FIG. 8 is a view showing an example of distances between a cluster center in a second cluster of FIG. 6 and spatial feature quantities.

FIG. 8 is a view showing an example of distances d between the center $\tau_c$ of a cluster in the second cluster $C_2$ of FIG. 6 (hereinafter, referred to as a cluster center) and spatial feature quantities.

A transfer function included in a cluster among the transfer functions estimated by the transfer function estimation unit 14 is a transfer function with respect to a sound source that comes from a direction which can be regarded as the cluster. The representative transfer function estimation unit 17 uses these transfer functions to determine the transfer function with respect to the cluster as a representative transfer function.

First, the representative transfer function estimation unit 17 determines the number of clusters and then obtains the centers $\tau_c$ of clusters by using Expression (11).

$$\tau_c = \frac{1}{N_c} \sum_{n \in c} \tau_{[n]} \qquad (11)$$

Next, the representative transfer function estimation unit 17 calculates distances $d_{[n]}$ between the cluster center and the spatial feature quantities for each speech zone by using Expression (12).

$$d_{[n]} = \|\tau_{[n]} - \tau_c\| \qquad (12)$$

An example of the cluster center and an example of distances between the cluster center and the spatial feature quantities are described.

In the example shown in FIG. 8, the distance between a spatial feature quantity $\tau_{[2]}$ and the cluster center $\tau_c$ is $d_{[2]}$, the distance between a spatial feature quantity $\tau_{[7]}$ and the cluster center $\tau_c$ is $d_{[7]}$, the distance between a spatial feature quantity $\tau_{[9]}$ and the cluster center $\tau_c$ is $d_{[9]}$, the distance between a spatial feature quantity $\tau_{[11]}$ and the cluster center $\tau_c$ is $d_{[11]}$, and the distance between a spatial feature quantity $\tau_{[13]}$ and the cluster center $\tau_c$ is $d_{[13]}$. A spatial feature quantity $\tau$ that is close to the cluster center $\tau_c$ can be a reliable sample. Therefore, in the present embodiment, a transfer function of the cluster center is obtained and is regarded as a transfer function with respect to a sound source.

Next, the representative transfer function estimation unit 17 obtains a sum $D_c$ of distances for each cluster by using Expression (13).

$$D_c = \Sigma_{n \in C} d_{[n]} \tag{13}$$

Next, the representative transfer function estimation unit 17 uses transfer functions $A_{[n]}(\omega)$ estimated by the transfer function estimation unit 14 and further performs weighting in consideration of the calculated distances from the cluster center to integrate the transfer functions as shown below to determine a representative transfer function.

In the present embodiment, a weighted value is defined as shown in Expression (14).

$$\text{Weighted value} = d_{[n]}/D_c \tag{14}$$

Next, the representative transfer function estimation unit 17 uses the calculated weighted value to obtain a representative transfer function $A_{mC}$ in a frequency domain (F) and a time domain (T) for each cluster by using Expression (15) and Expression (16). Note that, the used transfer function is an estimated transfer function that is associated with the spatial feature quantity classified into each cluster. Since a spatial feature quantity is for each speech zone, when one cluster includes, for example, five spatial feature quantities, the transfer functions are five transfer functions each corresponding to each one of the five spatial feature quantities, that is, each speech zone.

Note that, in the present embodiment, the obtained center for each cluster is a sound source position, and the transfer function in the direction to the cluster center is a transfer function in a sound source direction.

$$A_{mc[F]}(\omega, \psi) = \sum_{n \in C} \frac{d_{[n]}}{D_C} A_{[n]m}(\omega) \tag{15}$$

$$A_{mC[T]}(\omega, \psi) = \Pi_{n \in C} A_{[n]m}^{\frac{d_{[n]}}{D_C}}(\omega) \tag{16}$$

Next, the representative transfer function estimation unit 17 resolves the obtained transfer function in the frequency domain and the obtained transfer function in the time domain into a phase and amplitude as shown in Expression (17) and Expression (18).

$$A_{mC[F]}(\omega,\psi) = \lambda_{m[F]} \exp(-j\omega t_{m[F]}) \tag{17}$$

$$A_{mC[T]}(\omega,\psi) = \lambda_{m[T]} \exp(-j\omega t_{m[T]}) \tag{18}$$

According to Expression (17) and Expression (18), the representative transfer function $A_{mC}(\omega)$ is represented as shown in Expression (19).

$$A_{mC[T]}(\omega,\psi) = \lambda_{m[T]} \exp(-j\omega t_{m[F]}) \tag{19}$$

<Formulation of Transfer Function DB>

Next, estimation of a representative transfer function performed by the representative transfer function estimation unit 17 is described.

Figure 9:
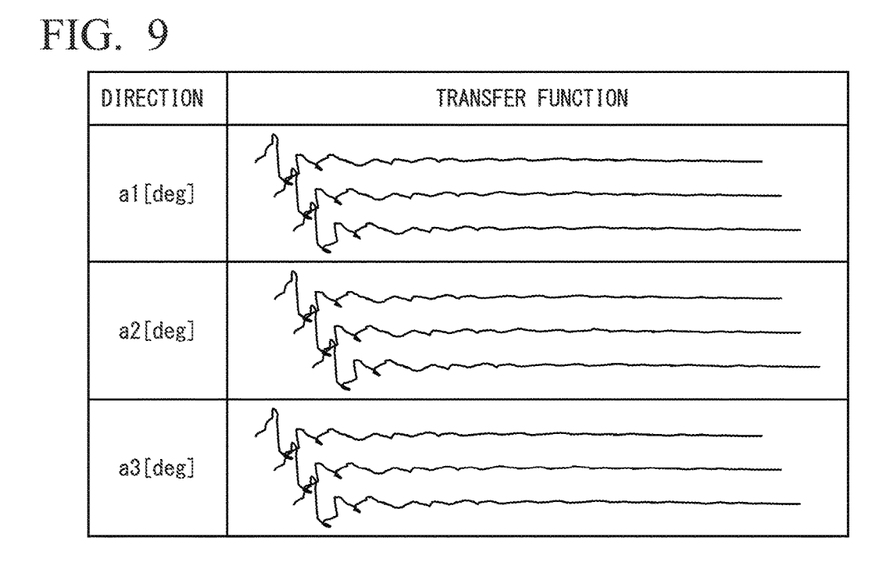
FIG. 9 is a view showing an example of information stored in a representative transfer function DB (database) according to the embodiment.

FIG. 9 is a view showing an example of information stored in the transfer function DB 18 according to the present embodiment. In the example shown in FIG. 9, transfer properties of a sound that comes from a first direction are stored as a transfer function in a first direction a1 [deg], transfer properties of a sound that comes from a second direction are stored as a transfer function in a second direction a2 [deg], and transfer properties of a sound that comes from a third direction are stored as a transfer function in a third direction a3 [deg].

However, as described above, since the positions of the microphones 201, the arrangement of the microphones 201, and the position relationship between the microphones 201 and the sound sources are unknown, this direction is a direction in a coordinate system in the speech-processing apparatus 1. Therefore, it is possible to associate each cluster with a transfer function. However, it is necessary to estimate which direction a sound physically comes from represented by each cluster.

The representative transfer function estimation unit 17 imparts, to each clustered direction, a pseudo angle that is irrelevant to an actual direction. Examples of a pseudo direction include, in FIG. 6, a first direction that is the cluster $C_1$ direction, a second direction that is the cluster $C_2$ direction, and a third direction that is the cluster $C_3$ direction. Thereby, the representative transfer function estimation unit 17 forms a database of a transfer function in which one cluster is one direction as shown in FIG. 9 and stores the formed database of a transfer function in the transfer function DB 18.

<Sound Source Localization>

Next, a process performed by the sound source localization unit 19 is described.

The sound source localization unit 19 calculates a MUSIC (multiple signal classification) spectrum for each direction output by the representative transfer function estimation unit 17 with respect to the speech signal output by the conversion unit 13 by using the transfer function stored in the transfer function DB 18.

Next, the sound source localization unit 19 performs normalization with respect to the MUSIC spectrum for each direction output by the representative transfer function estimation unit 17 such that the scale has a value of zero to one.

Next, the sound source localization unit 19 determines a threshold value for determining whether or not a sound is present in conformity to detection of a speech zone at the speech estimation unit 12. By using this threshold value, the sound source localization unit 19 performs rough sound source localization.

Next, the sound source localization unit 19 extracts a presence zone in which speech is present with respect to a single sound source from a localized result.

The speech estimation unit 12 uses a speech signal of a single sound source which is applied with sound source localization by the sound source localization unit 19 and from which a zone where a sound is present is extracted according to the threshold value to estimate a speech zone again. Thereby, the detection accuracy of a speech zone is improved compared to speech zone detection for the first time. The speech-processing apparatus 1 repeats a process of each unit until the transfer function converges. According to the repeat process, the speech-processing apparatus 1 can gradually obtain a transfer function that meets the sound source localization result.

Note that, the speech-processing apparatus 1 may perform an offline process until the transfer function converges and may perform an online process after the transfer function converges. Further, the generated transfer function may be output to a sound source separation apparatus (not shown) and the like, and the sound source separation apparatus may include the speech-processing apparatus 1.

<Process Sequence of Speech-Processing Apparatus 1>

Figure 10:
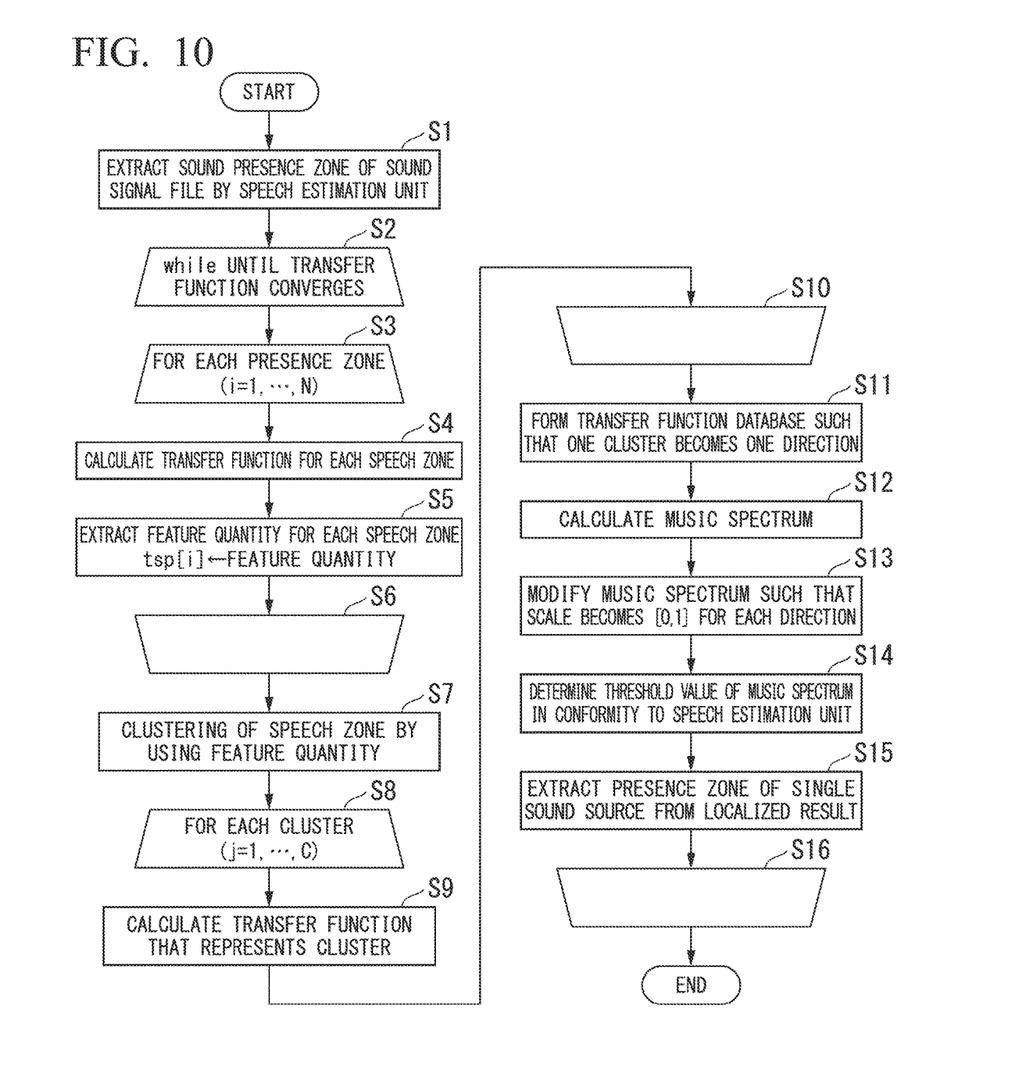
FIG. 10 is a flowchart of a process of the speech-processing apparatus according to the embodiment.

Next, a process sequence of the speech-processing apparatus 1 is described. FIG. 10 is a flowchart of a process of the speech-processing apparatus 1 according to the present embodiment. The speech-processing apparatus 1 performs the following process offline.

(Step S1) The speech estimation unit 12 extracts, for example, a sound signal of one session from sound signals of M channels output by the sound signal acquisition unit 11 and detects a presence zone in which a sound is present from the extracted sound signal of one session as a speech zone.

(Step S2) The speech-processing apparatus 1 repeats the processes of Step S3 to Step S15 until a transfer function converges.

(Step S3) The transfer function estimation unit 14 and the feature quantity calculation unit 15 select one from speech signals for each speech zone output by the conversion unit 13 and perform the processes of Step S3 to Step S5 for each speech zone based on the selected sound signal. Here, an example is described in which the number of speech zones is N.

(Step S4) The transfer function estimation unit 14 estimates a transfer function based on a signal of one channel (for example, first channel) in the speech zone selected in Step S3.

(Step S5) The feature quantity calculation unit 15 calculates, as a spatial feature quantity, a sample difference between a signal of one channel (for example, first channel) as a basis and a signal of another channel in the speech zone selected in Step S3. Note that, the sample difference is a signal phase difference between channels.

(Step S6) The transfer function estimation unit 14 and the feature quantity calculation unit 15 advance the process to Step S7 after the processes of Step S3 to Step S5 are completed for all speech zones.

(Step S7) The clustering unit 16 expands the feature quantity output by the feature quantity calculation unit 15 into an (M−1)-dimensional space and classifies the feature quantity by using an agglomerative clustering method to thereby estimate the number of sound sources (the number of speakers).

(Step S8) The representative transfer function estimation unit 17 selects one from the clusters estimated in Step S7 and performs a process of Step S9 for each cluster.

(Step S9) The representative transfer function estimation unit 17 obtains a center for each cluster estimated by the clustering unit 16 and calculates a distance between each feature quantity and the center for each cluster. Subsequently, the representative transfer function estimation unit 17 uses Expression (11) to Expression (19) and N transfer functions for each speech zone output by the transfer function estimation unit 14, performs weighting in consideration also of the distance from the center of the cluster, and integrates the transfer functions to determine a transfer function (representative transfer function) that represents the cluster.

(Step S10) The representative transfer function estimation unit 17 advances the process to Step S11 after the process of Step S9 is completed for all clusters.

(Step S11) The representative transfer function estimation unit 17 imparts, to each clustered direction, a pseudo angle that is irrelevant to an actual direction. Thereby, the representative transfer function estimation unit 17 forms a database of a transfer function in which one cluster is one direction and stores the formed database of a transfer function in the transfer function DB 18.

(Step S12) The sound source localization unit 19 calculates a MUSIC spectrum for each direction output by the representative transfer function estimation unit 17 with respect to the speech signal output by the conversion unit 13 by using the transfer function stored in the transfer function DB 18.

(Step S13) The sound source localization unit 19 performs normalization with respect to the MUSIC spectrum for each direction output by the representative transfer function estimation unit 17 such that the scale has a value of zero to one to thereby modify the MUSIC spectrum.

(Step S14) The sound source localization unit 19 determines a threshold value for determining whether or not a sound is present in conformity to detection of a speech zone by the speech estimation unit 12.

(Step S15) The sound source localization unit 19 performs sound source localization by using the threshold value determined in Step S14. Subsequently, the sound source localization unit 19 extracts, from the localized result, a presence zone in which speech is present with respect to a single sound source.

Then, the speech estimation unit 12 repeats the processes of Step S2 to Step S15 until the transfer function converges by using, as a signal of a speech zone, a speech signal of a single sound source which is applied with sound source localization by the sound source localization unit 19 and from which a zone where a sound is present is extracted using the threshold value.

(Step S16) The speech-processing apparatus 1 completes the process when the transfer function converges.

The present embodiment is described using an example in which one session is an entire meeting; however, the embodiment is not limited thereto. The one session may be a conversation until a break in a meeting or a conversation included in a predetermined time. The predetermined time is a time that includes speech for which the clustering process or estimation of a representative transfer function described above can be performed. The speech-processing apparatus 1 may obtain a transfer function and perform sound source localization in one session, and then, may perform an online process by using the estimated transfer function.

The present embodiment is described using an example in which the sound source localization unit 19 calculates a MUSIC spectrum by using the MUSIC method; however, the embodiment is not limited thereto. The sound source localization unit 19 may perform sound source localization by using another method that uses a transfer function.

As described above, the speech-processing apparatus 1 of the present embodiment includes: the representative transfer function estimation unit 17 that uses a sound signal which is collected by using the microphone array 2 of which the arrangement is unknown, which has a plurality of channels (1 to M), and of which the number of sound sources is unknown and that estimates a transfer function with respect to a sound source.

Further, the speech-processing apparatus 1 of the present embodiment further includes: a speech zone detection unit (speech estimation unit 12, speech zone estimation unit 121) that detects a plurality of speech zones from the sound signal that has the plurality of channels; the transfer function estimation unit 14 that estimates a transfer function by using a speech signal of a speech zone detected by the speech zone detection unit; the feature quantity calculation unit 15 that calculates a feature quantity $\tau$ by using the speech signal; and the clustering unit 16 that estimates the number of sound sources by classifying the feature quantity calculated by the feature quantity calculation unit into clusters, wherein the representative transfer function estimation unit 17 estimates each transfer function to each one of the clusters as each transfer function (representative transfer function) with respect to a sound source based on the transfer function estimated by the transfer function estimation unit and the number of sound sources estimated by the clustering unit.

According to the configuration, it is possible to estimate a transfer function with respect to a sound source from a sound signal, which is collected by using a microphone array of which the arrangement is unknown, and of which the number of sound sources is also unknown. It is possible to use the transfer function estimated in this way for sound source separation and sound source localization. As a result, according to the configuration, since it is unnecessary to emit a sound signal in advance to estimate the transfer function, it is possible to omit preparation prior to driving the apparatus.

As described above, in the speech-processing apparatus 1 of the present embodiment, the transfer function estimation unit 14 selects one from the plurality of channels included in the speech signal as a representative channel (for example, first channel) and estimates the transfer function by using the speech signal of the selected representative channel and the speech signal of the rest of the plurality of channels (for example, second to M-th channels).

According to the configuration, by using a sound signal of the representative channel, it is possible to estimate a transfer function for each speech zone, and it is possible to use the estimated transfer function to estimate a transfer function with respect to a sound source.

As described above, in the speech-processing apparatus 1 of the present embodiment, the feature quantity calculation unit 15 selects one from the plurality of channels included in the speech signal as a representative channel (for example, first channel) and calculates the feature quantity $\tau$ by using the speech signal of the selected representative channel and the speech signal of the rest of the plurality of channels (for example, second to M-th channels).

According to the configuration, by using a sound signal of the representative channel, it is possible to calculate a feature quantity for each speech zone, and it is possible to use the calculated feature quantity to estimate a transfer function with respect to a sound source.

As described above, in the speech-processing apparatus 1 of the present embodiment, the feature quantity $\tau$ is a value based on a phase difference between the speech signal of the representative channel (for example, first channel) and the speech signal of the rest of the plurality of channels (for example, second to M-th channels).

According to the configuration, by using a sound signal of the representative channel, it is possible to calculate a feature quantity for each speech zone, and it is possible to use the calculated feature quantity to estimate a transfer function with respect to a sound source. Further, according to the configuration, it is possible to estimate a transfer function by using a phase difference between the microphones 201 even in a state where a transfer function is not completely obtained in advance.

As described above, in the speech-processing apparatus 1 of the present embodiment, the clustering unit 16 determines, based on a distance $\Delta$ between the clusters to which the number of integrated clusters converges, the number of the clusters.

According to the configuration, it is possible to estimate the number of clusters, that is, the number of sound sources with good accuracy.

As described above, in the speech-processing apparatus 1 of the present embodiment, the representative transfer function estimation unit 17 calculates a center $\tau_c$ of each one of the clusters obtained by the clustering unit 16, calculates, with respect to the feature amount $\tau$ included in each cluster, a distance $d_{[n]}$ between the feature amount and the calculated center of each one of the clusters, calculates a weighted value by using a sum $D_C$ of the calculated distances and each one of the calculated distances, and estimates, by using a transfer function corresponding to the feature amount included in the cluster and the calculated weighted value, a transfer function in the center of the cluster as a transfer function to a sound source.

According to the configuration, by performing spatial clustering, it is possible to estimate a transfer function in which an assumed position of a speaker can be in a certain range.

Note that, a process such as estimation of a transfer function, sound source localization, and speech recognition may be performed by recording a program for realizing the function of the speech-processing apparatus 1 according to the invention on a computer-readable recording medium, reading the program recorded on the recording medium into a computer system, and executing the program. Here, the "computer system" may include an OS or hardware such as peripherals. The "computer system" may include a WWW system including a homepage-providing environment (or display environment). Examples of the "computer-readable recording medium" include portable mediums such as a flexible disk, a magneto-optical disk, a ROM, and a CD-ROM and a storage device such as a hard disk built in a computer system. The "computer-readable recording medium" may include a medium that temporarily holds a program for a predetermined time, such as a volatile memory (RAM) in a computer system serving as a server or a client in a case where the program is transmitted via a network such as the Internet or a communication circuit such as a telephone circuit.

The program may be transmitted from a computer system storing the program in a storage device or the like to another computer system via a transmission medium or by transmission waves in the transmission medium. Here, the "transmission medium" via which the program is transmitted means a medium having a function of transmitting information such as a network (communication network) such as the Internet or a communication circuit (communication line) such as a telephone line. The program may be configured to realize part of the above-described functions. Further, the program may be configured to realize the above-described functions by combination with a program recorded in advance in a computer system, such as a so-called differential file (differential program).

While embodiments of the invention have been described and shown in the drawings, it should be understood that the present invention is not limited to the above embodiments, and additions, omissions, substitutions, and other modifications of the configuration can be made without departing from the scope of the present invention. Accordingly, the invention is not to be considered as being limited by the foregoing description, and is only limited by the scope of the appended claims.

The invention claimed is:

1. A speech-processing apparatus, comprising:
a processor coupled to a memory and configured to:
use a sound signal which is collected by using a microphone array of which the arrangement is unknown, which has a plurality of channels, and of which a number of sound sources is unknown and estimate at least one transfer function with respect to a sound source;
detect a plurality of speech zones from the sound signal that has the plurality of channels;
estimate the at least one transfer function by using a speech signal of a detected speech zone;
calculate a feature quantity by using the speech signal;
estimate the number of sound sources by classifying the calculated feature quantity into clusters, wherein each transfer function to each one of the clusters is estimated as each transfer function with respect to a sound source based on the estimated transfer function and the estimated number of sound sources; and
store data representing recognition results for the number of estimated sound sources on the memory.

2. The speech-processing apparatus according to claim 1, wherein
one from the plurality of channels included in the speech signal is selected as a representative channel, and the at least one transfer function is estimated by using the speech signal of the selected representative channel and the speech signal of the rest of the plurality of channels.

3. The speech-processing apparatus according to claim 1, wherein
one from the plurality of channels included in the speech signal is selected as a representative channel, and the feature quantity is calculated by using the speech signal of the selected representative channel and the speech signal of the rest of the plurality of channels.

4. The speech-processing apparatus according to claim 3, wherein
the feature quantity is a value based on a phase difference between the speech signal of the representative channel and the speech signal of the rest of the plurality of channels.

5. The speech-processing apparatus according to claim 1, wherein
a number of the clusters is determined based on a distance between the clusters to which the number of integrated clusters converges.

6. The speech-processing apparatus according to claim 1, wherein
a center of each one of the obtained clusters is calculated, with respect to the feature quantity included in each cluster, a distance between the feature quantity and the calculated center of each one of the clusters is calculated,
a weighted value is calculated by using a sum of the calculated distances and each one of the calculated distances, and
by using a transfer function corresponding to the feature quantity included in the cluster and the calculated weighted value, the transfer function in the center of the cluster is estimated as the transfer function to a sound source.

7. A speech-processing method that causes a processor coupled to a memory to:
(a) acquire a sound signal which is collected by using a microphone array of which the arrangement is unknown, which has a plurality of channels, and of which the number of sound sources is unknown;
(b) detect a plurality of speech zones from the sound signal that has the plurality of channels;
(c) estimate a transfer function by using a speech signal of a speech zone detected in (b);
(d) calculate a feature quantity by using the speech signal;
(e) estimate the number of sound sources by classifying the feature quantity calculated in (d) into clusters; and
(f) estimate each transfer function to each one of the clusters as each transfer function with respect to a sound source based on the transfer function estimated in (c) and the number of sound sources estimated in (e).

8. A speech-processing apparatus, comprising:
a sound signal acquisition unit configured to acquire a plurality of sound signals having a plurality of channels;
a speech estimation unit configured to extract a sound signal of one session from the plurality of sound signals;
a conversion unit configured to output a speech signal for a speech zone of the number of speech zones based on the sound signal;
a transfer estimation unit configured to generate transfer functions for the speech zone of the number of speech zones;
a representative transfer function estimation unit configured calculate a feature quantity from the converted speech signal and estimate a number of sound sources by classifying the feature quantity into clusters, wherein each transfer function is applied to each one of the clusters to estimate a sound source of a plurality of sound sources; and
an output unit configured to output data representing recognition results for the estimated sound source.

9. The speech-processing apparatus of claim 8, further comprising:
a speech zone estimation unit configured to detect the number of speech zones and outputs a number a speech signals for each detected speech zone.

10. The speech-processing apparatus of claim 9, wherein the speech zone estimation unit detects the number of speech zones using a zero-cross method.

11. The speech-processing apparatus of claim 8, wherein the conversion unit converts the speech signal using a short-time Fourier transform into a frequency domain.

12. The speech-processing apparatus according to claim 8, wherein a number of the clusters is determined based on a distance between the clusters to which the number of integrated clusters converges.

13. The speech-processing apparatus according to claim 8, wherein
a center of each one of the obtained clusters is calculated, with respect to a feature quantity included in each cluster, a distance between the feature quantity and the calculated center of each one of the clusters is calculated,
a weighted value is calculated by using a sum of the calculated distances and each one of the calculated distances, and
by using a transfer function corresponding to the feature quantity included in the cluster and the calculated weighted value, a transfer function in the center of the cluster is estimated as a transfer function to a sound source.

\* \* \* \* \*